(12) United States Patent
Papadimitriou

(10) Patent No.: US 8,964,565 B2
(45) Date of Patent: Feb. 24, 2015

(54) METHOD AND ROUTER FOR IMPROVED UPDATING OF A ROUTING INFORMATION BASE

(75) Inventor: Dimitri Papadimitriou, Brussels (BE)

(73) Assignee: Alcatel Lucent, Boulogne-Billancourt (FR)

( * ) Notice: Subject to any disclaimer, the term of this patent is extended or adjusted under 35 U.S.C. 154(b) by 40 days.

(21) Appl. No.: 13/698,511

(22) PCT Filed: Jun. 7, 2011

(86) PCT No.: PCT/EP2011/059364
§ 371 (c)(1),
(2), (4) Date: Jan. 28, 2013

(87) PCT Pub. No.: WO2011/154391
PCT Pub. Date: Dec. 15, 2011

(65) Prior Publication Data
US 2013/0121340 A1 May 16, 2013

(30) Foreign Application Priority Data

Jun. 11, 2010 (EP) .................................... 10305625

(51) Int. Cl.
*H04J 1/16* (2006.01)
*H04L 12/751* (2013.01)
*H04L 12/707* (2013.01)
*H04L 12/741* (2013.01)

(52) U.S. Cl.
CPC .............. *H04L 45/02* (2013.01); *H04L 45/026* (2013.01); *H04L 45/22* (2013.01); *H04L 45/54* (2013.01)
USPC ............................. 370/237; 370/238; 370/242

(58) Field of Classification Search
USPC .......................... 370/242, 216, 248, 237, 238
See application file for complete search history.

(56) References Cited

U.S. PATENT DOCUMENTS

| | | | |
|---|---|---|---|
| 6,392,997 B1 * | 5/2002 | Chen | 370/252 |
| 6,829,221 B1 * | 12/2004 | Winckles et al. | 370/238 |
| 7,035,934 B1 * | 4/2006 | Lin | 709/238 |
| 7,430,176 B2 * | 9/2008 | Nalawade et al. | 370/238 |
| 8,149,897 B2 * | 4/2012 | Abraham | 375/148 |

(Continued)

FOREIGN PATENT DOCUMENTS

WO   WO-2004114568 A2   12/2004

OTHER PUBLICATIONS

International Search Report PCT/ISA/210 for International Application No. PCT/EP2011/059364 dated Jul. 8, 2011.

(Continued)

*Primary Examiner* — Ricky Ngo
(74) *Attorney, Agent, or Firm* — Harness, Dickey & Pierce

(57) ABSTRACT

Method for use in updating a routing information base of a node of a network, said routing information base comprising for each destination node of a number of destination nodes in said network a number of paths; wherein an update message with routing information is sent in said network from a first node to a peer of the first node, said first node having a first routing information base; wherein the update message comprises: a selected path for a first destination node of said number of destination nodes, said selected path comprising a next hop node adjacent the first node; at least one routing topology variable derived from the number of paths available for said first destination; said at least one routing topology variable being a measure for the risk on bottlenecks in the selected path.

14 Claims, 5 Drawing Sheets

(56) References Cited

U.S. PATENT DOCUMENTS

| | | | |
|---|---|---|---|
| 8,416,839 B2* | 4/2013 | Issler et al. | 375/150 |
| 2002/0051449 A1 | 5/2002 | Iwata | |
| 2004/0264466 A1 | 12/2004 | Huang | |
| 2005/0025118 A1* | 2/2005 | Hao et al. | 370/351 |
| 2006/0075136 A1 | 4/2006 | Iwata | |

OTHER PUBLICATIONS

A Border Gateway Protocol 4 (BGP-4); Request for Comments (RFC) 4271: http://www.ietf.org/rfc/rfc4271, Jan. 2006.

* cited by examiner

METHOD AND ROUTER FOR IMPROVED UPDATING OF A ROUTING INFORMATION BASE

TECHNICAL FIELD

The present invention relates to a method for use in updating a routing information base of a node of a network, wherein update messages with routing information are sent from each node to its peers. The invention also relates to a router, typically a BGP router, and to a processing means for use in such a router.

BACKGROUND

There exist a number of methods to improve BGP convergence by increasing the routing information propagation rate or by increasing the number of routing states by labelling primary and back-up AS paths. The first method has the drawback that the optimal advertisement interval depends on the topology which is variable. The latter has the disadvantage that the number of routing states to be maintained in the router is doubled.

SUMMARY

The object of the invention is to provide a method, router and processing means allowing updating of the routing information base in an improved way.

According to an embodiment of the invention there is provided a method for use in updating a routing information base of a node of a network, wherein update messages with selected routes are sent from each node to its peers, which update messages comprise topological information for the selected routes. The topological information will allow to update the routing information base in an improved way.

According to a particular embodiment the invention relates to a method for use in updating a routing information base of a node of a network, said routing information base comprising for each destination node of a number of destination nodes in said network a number of paths. An update message with routing information is sent in said network from a first node to its peers, said first node having a first routing information base and each peer also having a routing information base. The update message comprises a selected path for a first destination node of said number of destination nodes, said selected path comprising a next hop node adjacent the first node; and at least one routing topology variable, preferably derived from the number of paths stored in the first routing information base for said first destination. Said at least one routing topology variable is preferably a measure for the risk on bottlenecks in the selected path. In that way the node receiving the update message can take into account said at least one topology variable when deciding on the path to select for the first destination.

According to a preferred embodiment the at least one routing topology variable comprises a diversity variable related to the number of paths stored in the first routing information base for said first destination node; and/or a concentration variable related to the number of paths stored in the first routing information base having the same next-hop node as the selected path for the first destination node. Those variables can e.g. be expressed as Rs and BC as will be further detailed in the figure description below.

According to a preferred embodiment the method further comprises the step of deciding at a peer of the first node on the updating of the routing information base of said peer, taking into account the at least one topology variable received from the first node.

According to a preferred embodiment of the invention each node of the plurality of nodes is represented by a Border Gateway Protocol (BGP) router. When using BGP, a table of IP networks or 'address prefixes' (or simply 'prefixes') are maintained at the BGP router, which prefixes designate the network reachability among autonomous systems (AS). In case of BGP, the Routing Information Base (RIB) typically comprises: a first part (Adj-RIBs-In) storing routing information from inbound update messages; a second part (Loc-RIB) storing selected local routing information, and a third part (Adj-RIBs-Out) storing the routing information to be included in update messages to be sent to its BGP peers. The selected path for the first destination as contained in the update message sent by the first node to its peer is stored in the first part of said peer; and the second part and the third part of said peer are updated taking into account the at least one topology variable contained in the update message received from the first node.

According to a preferred embodiment the diversity variable is related to the number of paths stored in the first part of the first routing information base for said first destination node.

According to a preferred embodiment of the invention the concentration variable is related to the number of paths stored in the second part of the first routing information base having the same next-hop node as the selected path for the destination node. According to an alternative solution the first part could also be used to obtain the concentration variable.

According to a preferred embodiment of the invention the update message is a BGP update message comprising an AS_Path attribute with the selected path and the diversity and concentration variable encoded as a vector matching the AS_Path attribute.

In a typical embodiment of the method of the invention each node of the network will send update messages to its peers according to one of the embodiments of the method above. Preferably, the update message sent by each node will also comprises the at least one topology variable received from the nodes present in the selected path. In other words, an update message sent by a first node will not only comprise the at least one topology variable derived from the number of paths stored in the first routing information base for said first destination, but also the at least one topology variable derived in the other nodes of the selected path and received by the first node through its peers.

The invention also relates to a router. According to an embodiment thereof, the router comprises a routing information base comprising for each destination node of a number of destination nodes of a network a number of paths; composing means for composing an update message with routing information comprising a selected path for a first destination node of said number of destination nodes, said selected path comprising a next hop adjacent the router; and at least one routing topology variable derived from the number of paths for said first destination, preferably as stored in the first routing information base.

According to a preferred embodiment the router further comprises processing means for processing information in the router information base, said processing means comprising decisions means adapted to decide on the updating of the routing information base taking into the at least routing topology variable contained in a received update message. The invention also relates to such a processing means as such.

According to a preferred embodiment the router is a BGP router; and the routing information base comprises a Loc-RIB Part, an Adj-RIB-In part and an Adj-RIB-Out part.

Further advantageous embodiments of the method and router of the inventions are disclosed in the attached claims.

The accompanying drawings are used to illustrate presently preferred non-limiting exemplary embodiments of the present invention. The above and other advantages or features and objects of the invention will become more apparent and the invention will be better understood from the following detailed description when read in conjunction with the accompanying drawings in which.

According to a currently preferred embodiment of the invention the Border Gateway Protocol (BGP) is used for updating the routing information in a router. However the skilled person will understand that the invention is not limited to BGP and that the invention can also be used in combination with other path vector routing protocols. BGP is discussed in Request for Comments (RFC) 4271 (http://www.ietf.org/rfc/rfc4271) which is incorporated herein by reference. BGP is a routing protocol of the Internet, maintaining a table of IP networks or prefixes which designate network reachability among Autonomous Systems (ASs). BGP is an Internet inter-domain/inter-AS routing protocol, is a policy-based shortest AS path vector routing protocol providing loop avoidance by detection, using the AS_Path information includes in BGP update messages. In BGP, a route is defined as a unit of information that pairs a set of destinations (reachability information) with the attributes of a path to these destinations. Routes are advertised between BGP routers in Update messages. The actual path to this set of destinations is the information reported in the AS_Path attribute that enumerates the sequence of Autonomous Systems (AS) numbers that the reachability information has traversed through BGP Update message. This information is sufficient for constructing a graph of AS connectivity (AS routing topology), from which routing loops may be detected and avoided, and, at the AS level, some policy decisions may be enforced.

The following sections provide more details about BGP for getting a better understanding of the invention, but are not intended to limit the invention. BGP routers (or BGP speakers) advertise network reachability information about destinations by sending to their neighbours UPDATE messages containing a set of destination address prefix announcements (feasible routes) or withdrawals (unfeasible routes) together with attributes associated to a path to these destinations. An announcement informs neighbouring BGP routers of a path to a given destination. A withdrawal is an update indicating that a previously advertised destination is no longer reachable. When a local BGP router propagates a route learned from the UPDATE message sent by one of its Peering BGP routers, it modifies the route's AS_Path attribute based on the location of the BGP router to which the UPDATE message containing that route will be sent. In contrast, route withdrawals only contain the destination and implicitly tell the receiver to invalidate (or remove) the route previously announced by the sender.

Figure 1:
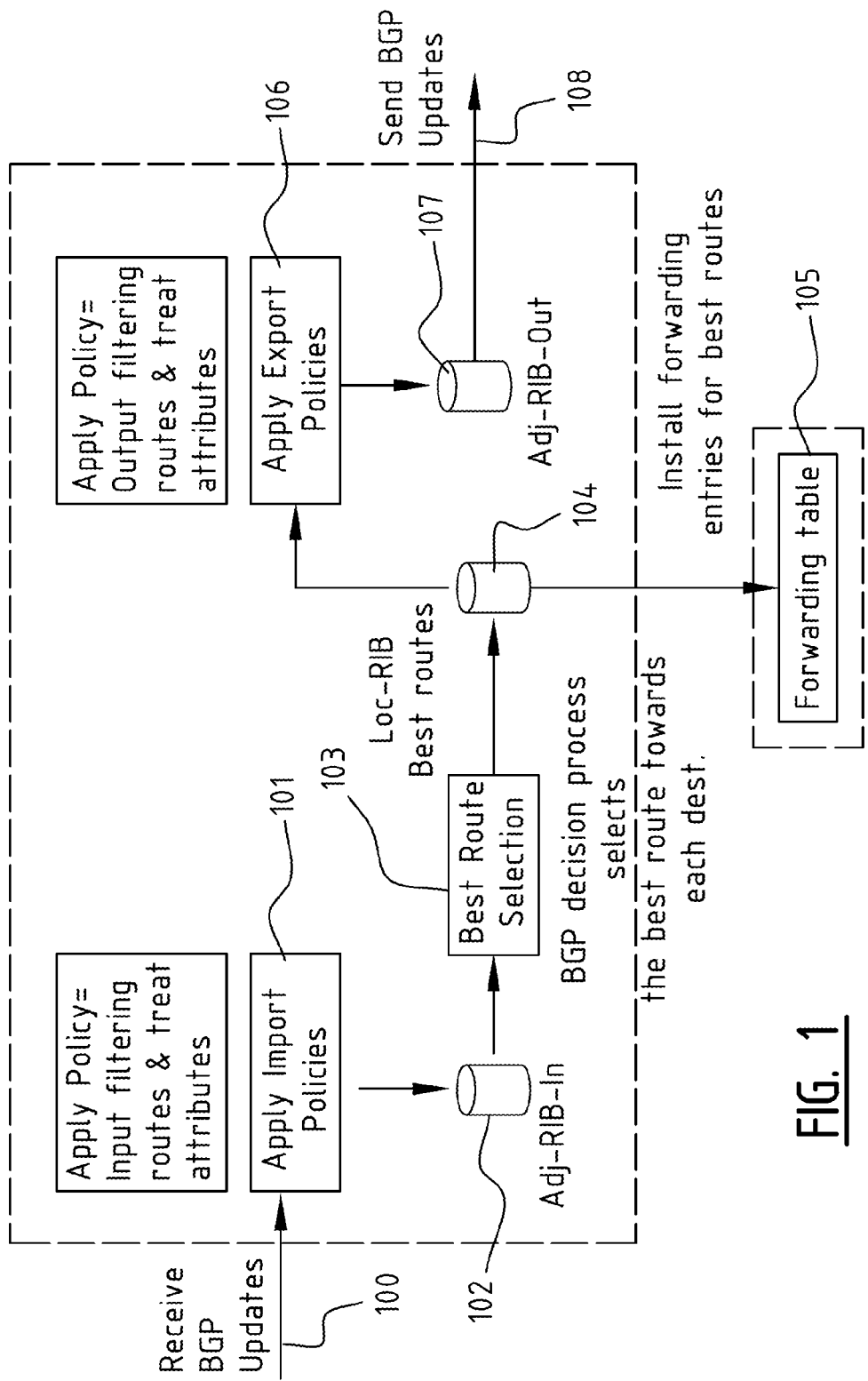
FIG. 1 is a schematic drawing illustrating BGP routing information processing.

The BGP routing information processing will now be illustrated with reference to FIG. 1. Routes are stored in Routing Information Bases (RIBs). At each BGP speaker, the RIB consists of three distinct parts:

an Adj-RIBS-In part 102 storing routing information learned from inbound UPDATE messages 100 received from other BGP speakers. These routes are typically available as input to the Decision Process after applying Import Policy rules 101, see further;

a Loc-RIB 104 containing the local routing information the BGP speaker has selected by applying its local policies 103 to the routing information contained in its Adj-RIBs-In part 102. These are the routes that will be used by the local BGP speaker, typically in a forwarding table 105;

an Adj-RIBS-Out part 107 storing routing information the local BGP speaker has selected for advertisement to its peers. This routing information will be carried in the local BGP speaker's UPDATE messages and advertised to its peers by means of the local speaker's UPDATE messages 108, typically after applying Export Policy rules 106, see further.

In other terms, the Adj-RIBs-In 102 contains unprocessed routing information that has been advertised to the local BGP speaker by its peers; the Loc-RIB 104 contains the routes that have been selected by the local BGP speaker's Decision Process 103; and the Adj-RIBs-Out 107 organizes the routes for advertisement to specific peers (by means of the local speaker's UPDATE messages).

When a router receives an UPDATE message, typically it will first apply a filtering process 101 using some import policies. The collection of routes received from all neighbours (external and internal) is the set of candidate routes (for that destination). Subsequently, the BGP router invokes the route decision process 103—guided by locally defined policies—to select a single best route from this set. If accepted, the selected route is stored in the Loc-RIB 104. After this, the selected best route is subjected to some export policies 106 and then announced to all the router's neighbours. Prior to being announced to an external neighbour, but not to an internal neighbour in the same AS, the AS path carried in the announcement is pre-pended with the AS number of the local AS. When a BGP speaker receives for the same destination prefix more than one feasible route, the BGP route selection rules 103 are used to choose which route is installed in the Loc-RIB. Usually, not selected/unprocessed routing information is maintained in case currently selected information is being withdrawn or superseded. Typically, the BGP decision process selects a route by applying one or more of the following criteria in the following order: Highest Local Preference (value computed for each external route using the locally configured policy, and advertised to internal peers), Shortest AS_Path length, Lowest Multi-Exit Discriminator (MED) value, Lowest IGP cost to BGP egress, and finally the Lowest BGP Router_ID. Hence, the local preference which translates route preference based on inferred inter-AS relationship (policy-driven) implies that the shortest path is not necessarily the most preferred path: selection can not be restricted to preference according to AS path length only.

To prevent exponential increase of the number of routing table entries, BGP (or more generally any path vector routing) typically only advertises to its (downstream) BGP speakers a single route per destination as selected by its route decision process. According to the prior art, the routing information processed by remote routers does not convey any indication if the selected route can become a bottleneck in case of failure.

According to an embodiment of the invention topological information is associated to the announced routes so as to allow remote BGP routers to prevent selection of route(s) that are more likely to become unavailable than alternative routes (when alternative routes are available).

Intuitively, the problem this invention aims at solving is to enable BGP speakers to perform a route decision using additional information. In other words an embodiment of the invention proposes a bottleneck informed routing selection process.

Figure 2:
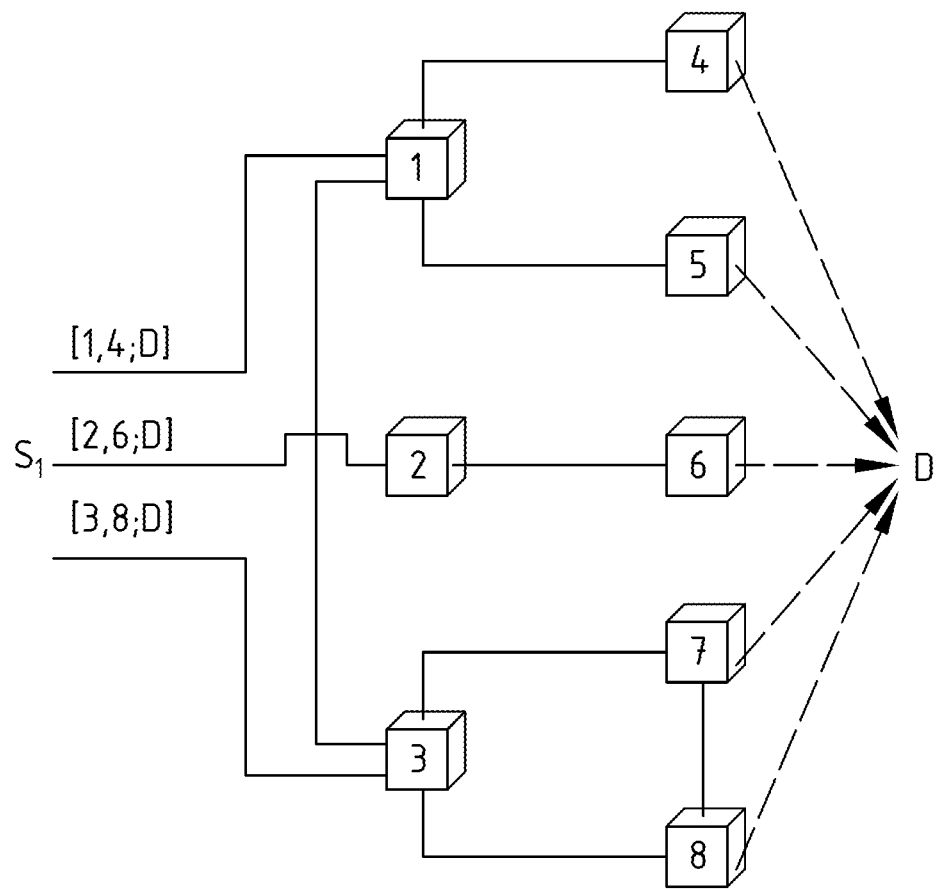
FIG. 2 is a topology graph illustrating a first problem which can be solved by an embodiment the invention.
Figure 3:
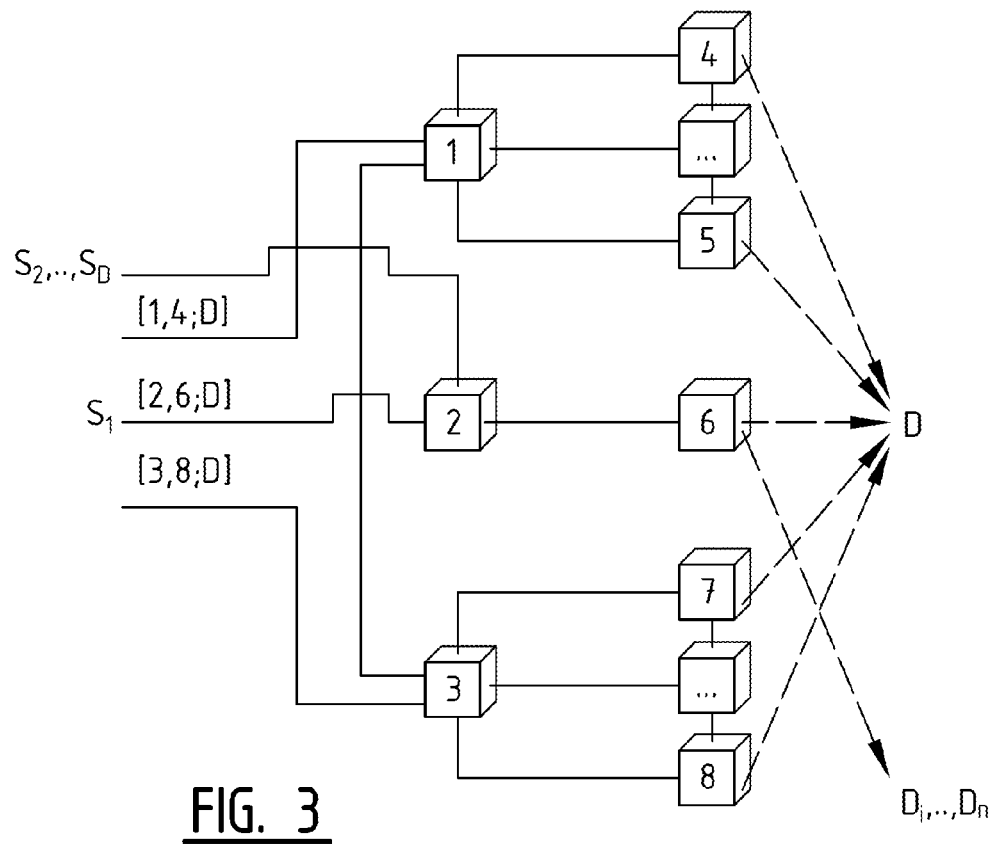
FIG. 3 is a topology graph illustrating a second problem which can be solved by an embodiment the invention.

To better understand the problem solved by the invention reference is made to FIGS. 2 and 3. FIG. 2 is a topology graph where, in case of BGP, autonomous systems are represented as abstract nodes. In this example, router S can select e.g. among the AS_Paths [1,4], [2,6] and [3,8] towards destination D. Even if these 3 paths are equivalent in terms of the AS_Path length, they are nevertheless not equivalent because the individual AS along each of these paths have different volumes d, defined as the sum of the weight of the links incident to a given AS. Assuming that each link has a weight w=1, the link connectivity or volume of AS 6 and AS 2 is equal to 2 (d=2), the link connectivity of AS_4 is equal to 2 (d=2) and AS 1 is equal to 4 (d=4), whereas volume of AS 3 is equal to 4 (d=4) and AS 8 equal to 3 (d=3). S should thus preferentially select AS_Path [3,8] towards destination D over AS_Path [1,4] and finally AS_Path [2,6] which should be the less preferred choice.

However, to further improve the selection, it is advantageous to obtain additional information for a reason that can be deduced from FIG. 3. AS link connectivity volume is a quantity which does not inform about the relative "importance" of the AS. Indeed, as shown in FIG. 3, AS 2 has small link connectivity and the effect of its removal is not determined by its volume but by the fact a high number of paths cross this AS (as well as traversing the link defining the adjacency between AS 2 and AS 6), see the thick line in FIG. 3. A good measure of the "importance" of a node (sometimes referred to as centrality) has thus to incorporate a global information such as its role played in the existence of m×n paths between any pair of nodes in the network (between $S_2, \ldots, S_m$ and $D_1, \ldots, D_n$). The corresponding information can then be used to determine how many routes share the same outgoing link towards the next-hop AS. It is noted that these routes do not necessarily share the same destination (they share at least the same next-hop AS). Such information is useful when path-vector routing decision process has to perform its decision among two (or more) feasible paths showing the same level of connectivity.

Figure 4:
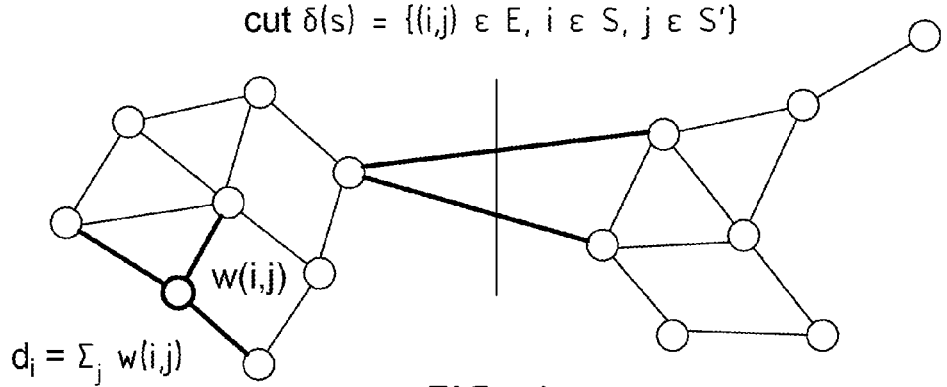
FIG. 4 is a topology graph illustrating a number of definitions used in an embodiment of the invention.

To define an embodiment of the invention in a more mathematical way, first some definitions will be given with reference to FIG. 4. Let G=(V,E,ω) be a weighted undirected graph with positive edge cost ω, where V is the set of vertices (|V|=m) and E is the set of edges (|E|=n). The volume $d_i$ of a vertex i is defined as:

$$d_i = \Sigma_j w(i,j)$$

The volume of a set of vertices S (or cluster) vol(S) is defined as:

$$vol(S) = \Sigma_{i \in S} d_i$$

For a partition (S,S') of the vertex set V of a graph G=(V,E,ω) we also define:

$$cut\ d(S) = \{(i,j) \in E, i \in S, j \in S'\}$$

its volume:

$$vol(d(S)) = \Sigma_{i \in S} \Sigma_{j \in S'} w(i,j);$$

and the conductance φ(S) of the cut δ(S)

$$\phi(S) = vol(d(S))/\min\{vol(S), vol(S')\}$$

The conductance is a measure for the convergence speed, see "L. Lovasz and M. Simonovits, "The mixing rate of Markov chains, an isoperimetric inequality, and computing the volume", Proceedings of 31st Annual Symposium on Foundations of Computer Science (FOCS) 1990, vol. 1, pp. 346-354, IEEE Computer Society Press, October 1990. Conductance measures if there is a bottleneck in the graph. By selecting "regions" of high conductance faster converge can be obtained.

We also introduce the betweenness centrality (BC) of a link/node. BC measures the number of shortest paths passing through a node or link and, thus, estimates the potential load on this node/link assuming uniform distribution following shortest paths. Let $d_{ij}$ be the number of shortest paths between nodes i and j and let l be either a node or link. Let $d_{ij}(l)$ be the number of shortest paths between i and j going through node or link l. Its betweenness is:

$$BC(l) = \Sigma_{ij} d_{ij}(l)/d_{ij}$$

Note that high BC values translate also (relatively) higher computational load that may increase convergence time.

According to an embodiment of the invention each BGP routing UPDATE message carries a composed routing metric or variable being the transposition of the node connectivity volume vol(d(S)) and the conductance φ(S) of a cut d(S) as defined above. Indeed, these topology metrics are transposed into metrics for the BGP routing system.

More in particular, the metric is chosen to count for the number of path-vector routing adjacencies, e.g. BGP peering sessions, over which the same destination prefix (with different attributes) have been received and installed in the Adj-RIB-In entry in case of BGP. This metric is a measure for the ratio Rs, between the uniquely selected route and the number of received routes for the same destination prefix (cutting all these link adjacencies would isolate the selecting AS from the destination), i.e., in case of BGP Rs measures the number of the BGP peering sessions over which the same destination prefix (possibly with different attributes) has been received.

According to an embodiment of the invention each BGP routing UPDATE message carries a variable which is the transposition of the Betweenness Centrality (BC) topology metric as (path-vector) routing metric. More in particular this variable can be chosen as the relative BC of a link l incident to a given AS, BC_AS(l). BC_AS(l) is defined as the ratio between the number of selected AS_Path's traversing link l towards destination D via a given next-hop AS over all other selected routes crossing the same incident link l (via the same next-hop AS), i.e., in the case of BGP, typically all routes of the Loc-RIB having the same next-hop AS (as the AS_Path towards D).

According to a further embodiment an additional or alternative metric is used. This metric can be the ratio Rb between the uniquely selected route towards destination D (the route installed in the Loc-RIB) and the total number of the BGP peering sessions over which a route towards that destination could be received; thus, including all BGP sessions over which a route for that destination has been received (part of the Adj-RIB-In) but also the sessions over which that a route for that destination prefix has not been received, however not counting the static routes.

It will be clear to the skilled person that each of the above disclosed path-vector routing metrics can also be used independently, i.e. the present invention does not necessarily mandate their combined usage; of course, their combination provides to the local router more information during its route selection process (from the set of routes stored Adj_RIB_In to the Loc_RIB).

According to a preferred embodiment of the method of the invention each BGP routing UPDATE message carries the value Rs and BC_AS(l) encoded as a vector matching the AS_Path attribute.

The metrics BC_AS(l) and Rs are subject to topological changes and site/prefix addition/withdrawals. Therefore, minimum and maximum thresholds are preferably introduced to limit the possible resulting updates: when crossing a maximum threshold (coming from lower values) or when crossing a minimum threshold (coming from upper values) the corresponding attribute is not re-advertised. In between the corresponding attribute is modified and the router re-advertised. Moreover, oscillation effects around these thresholds may be suppressed by means of exponential back-off. More sophisticated threshold techniques could be used based on the Generalized threshold ARIMA (AutoRegressive Integrated Moving Average). Note that typically the rate at which routing UPDATE messages are sent is limited by means of the Minimum Route Advertisement Interval (MRAI) time interval, see RFC4271. In a preferred embodiment, the proposed solution does not increase the number of BGP UPDATE messages. Rather, it adds a combined metric to the selected route based on the current decision process defined in RFC4271.

Now an embodiment of the invention will be defined in mathematical terms. We define a path P in graph G=(V,E) as the sequence of nodes $(v_k, v_{k-1}, \ldots, v_1)$, $k>0$, such that for each i, $k \geq i > 1$, $\{v_i, v_{i-1}\} \in E$. Each non-empty path $P=(v_k, v_{k-1}, \ldots, v_1; D)$ has a direction towards destination D from its first node $v_k$ to its last node $v_1$. BGP routers receives the tuple <destination;{attributes}> where {attributes} includes the proposed metric vector $[<Rs,BC(l)>_k, \ldots, <Rs,BC(l)>_1]$ in addition to the existing attributes such as the $P=(v_k, v_{k-1}, \ldots, v_1; D)$. Note that each tuple $<Rs,BC(l)>_i$, carries different values for the composite Rs and BC(l) metrics depending on the local topology for node $v_i$; in fact the tuple associate to node $v_i$ is $<Rs_i, BC_i(l)>$ where at each node $v_i$, the link l is incident to node $v_i$; however in order to simplify the notation we use $<Rs, BC(l)>_i$. The selection process is preferably recursive from $v_1$ up to $v_k$, such that each BGP router $v_i$ along the path from $v_1$ to $v_k$ can perform route selection (on its Adj-RIB-in entries) using a decision criteria on the tuple $<Rs,BC(l)>_{i-1}, \ldots, <Rs,BC(l)>_1$ so as to avoid bottlenecks or adjacency failures. More in particular, $v_1$ will send an update message to $v_2$ containing $<Rs, BC(l)>_1$, and $v_2$ will then send an update massage to $v_3$ containing $<Rs, BC(l)>_2$, and $<Rs, BC(l)>_1$ as received from $v_1$, etc.

Figure 7:
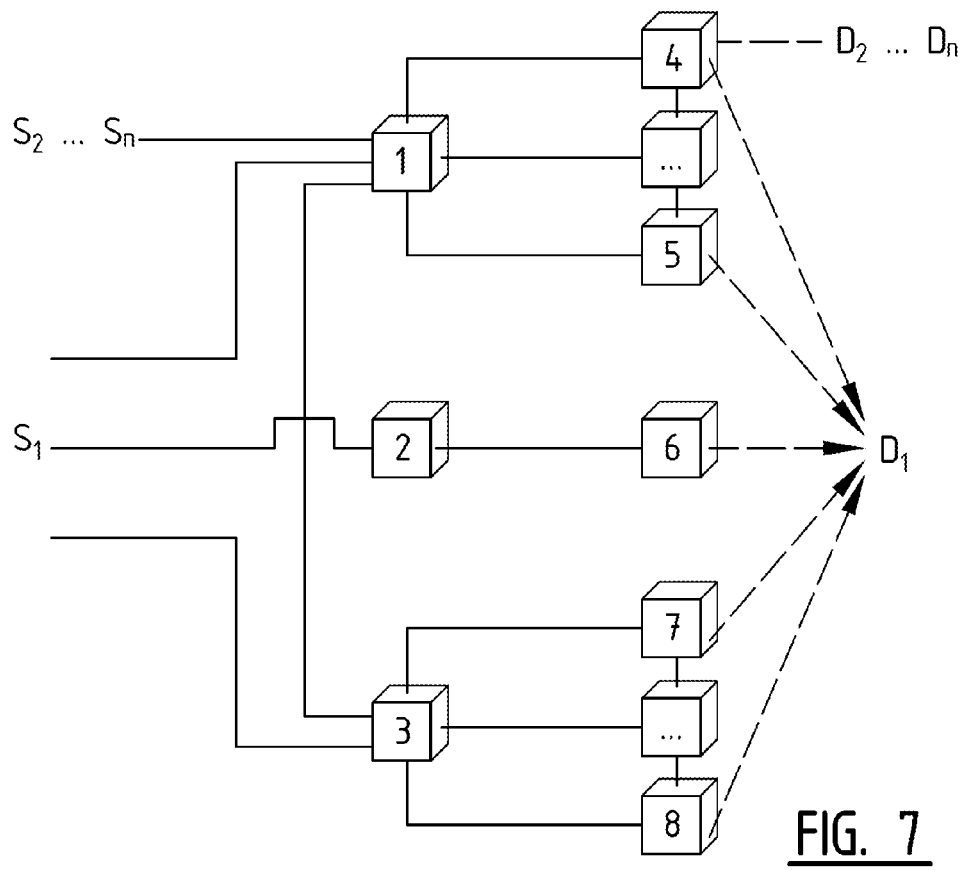
FIG. 7 is a topology graph illustrating an exemplary embodiment of the method of the invention.

An example thereof is illustrated in FIG. 7. This example depicts the combined usage of this composite metric. It is assumed that the AS_Path towards $D_1$ as selected by node 1 is [1,4], that the path selected by node 2 is [2,6], and that the path selected by node 3 is [3,8]. $S_1$ can select AS_Path [3,8] towards destination $D_1$ over the two other alternatives AS_Path [1,4] and AS_Path [2,6] towards that destination $D_1$. Indeed, AS_3 and AS_1 both receive a route to destination $D_1$ from three distinct BGP neighbours instead of one in case of AS_Path [2,6]. In other words $Rs_3=1/3$ and $Rs_1=1/3$ are smaller than $Rs_2=1/1$. This leaves AS_Path[3,8] and AS_Path [1,4] as possible choices for $S_1$. However, as the number of routes selected by AS_3 (that share the same link as the link incident to AS_3 towards AS_8) is less than the number of routes selected by AS_1 (that share the same link as the link incident to AS 1 towards AS 4), $S_1$ selects AS_Path[3,8]. In other words, $BC_1([1,4])$ is larger than $BC_3([3,8])$ because of paths $S_2, \ldots, S_n$ to $D_2, \ldots, D_n$ passing through link [1,4].

When node AS_3 sends un update message to its peers (such as $S_1$) for destination $D_1$, this update message will comprise the selected AS_Path [3,8] for destination $D_1$ together with $<Rs, BC(l)>_3$, and $<Rs, BC(l)>_R$. Similarly, when node AS_1 sends un update message to its peers for destination $D_1$, this update message will comprise the selected AS_Path [1,4] for destination D1 together with $<Rs, BC(l)>_1$, and $<Rs, BC(l)>_4$. Based on this information source S1 will then select AS_Path [3,8].

Figure 5:
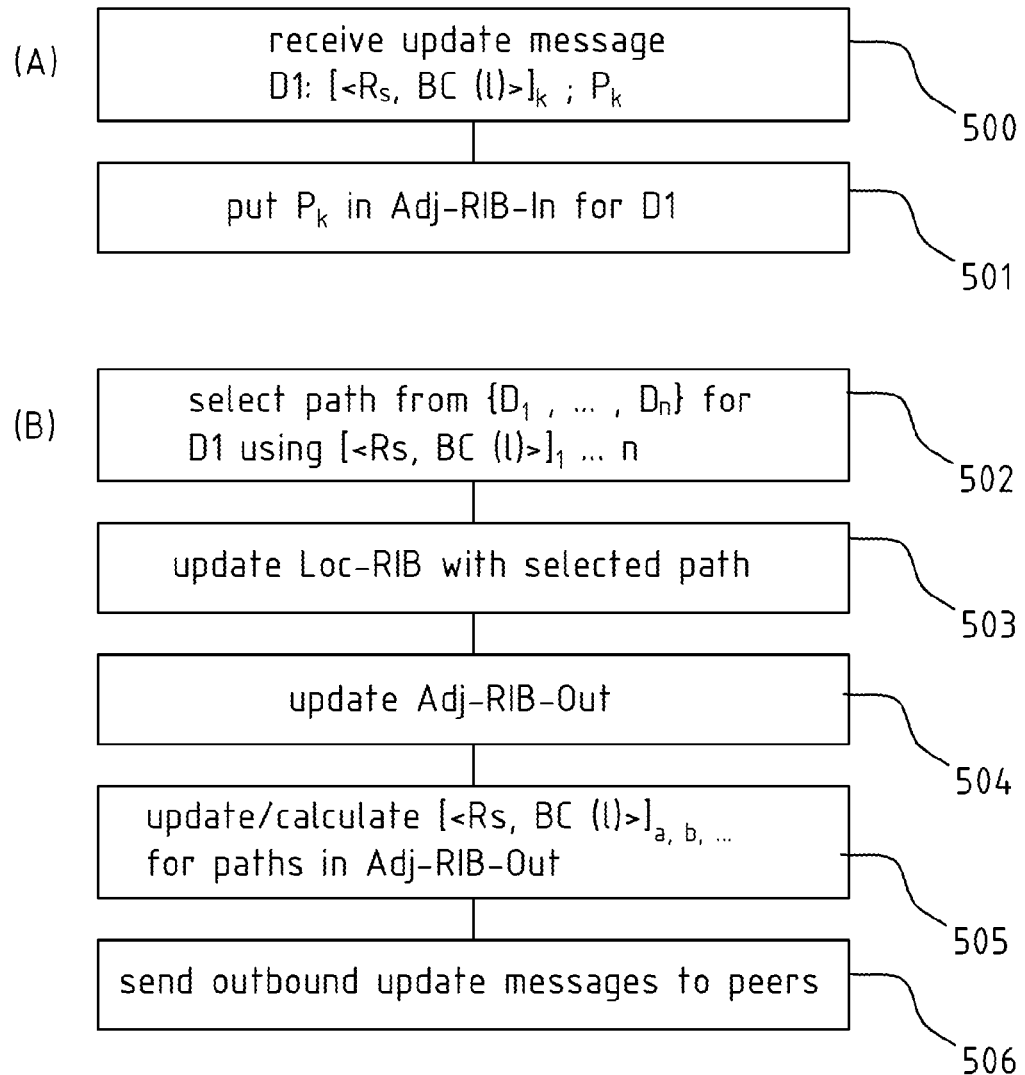
FIG. 5 is a flow chart illustrating an embodiment of the method of the invention.
Figure 5:
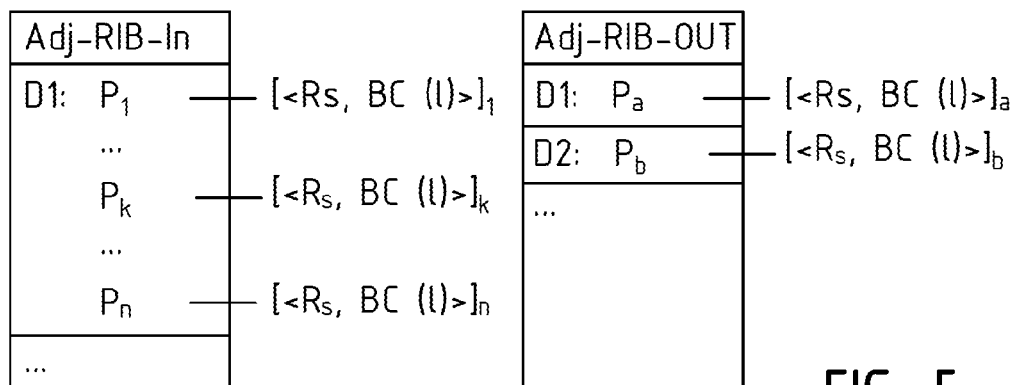

FIG. 5 illustrates an embodiment of the method of the invention. In part A of FIG. 5, in a first step 500 an inbound update message is received containing for destination $D_1$ a path $P_k$ and corresponding topology information $[<Rs, BC(l)>]_k$. In a second step 501 the path $P_k$ is put in the Adj-RIB-In 510 for $D_1$. The corresponding topology information will be stored for use by the decision means, see further. Those steps are typically repeated for a number of update messages for destination $D_1$ with paths $P_k$, $1<k<n$, see the result in the Adj-RIB-In 510.

The routing information processing is illustrated in part B of FIG. 5. In a first step 502, a path is selected for destination $D_1$ using $[<Rs,BC(l)>]_k$, wherein $1<k<n$. In a second step 503 the Loc-Rib is updated with the selected path, and in a third step 504 the Adj-RIB-Out is updated (e.g. as explained with reference to FIG. 1). Next the topology information $[<Rs,BC(l)>]_{a,b}, \ldots$ is calculated or updated for the new or updated paths $P_a, P_b$, etc for the different destinations $D_1, D_2$, etc in the Adj-RIB-Out 520, see step 505. In a final step 506, the outbound messages are composed with the respective paths and topology information and sent to the peers.

Figure 6:
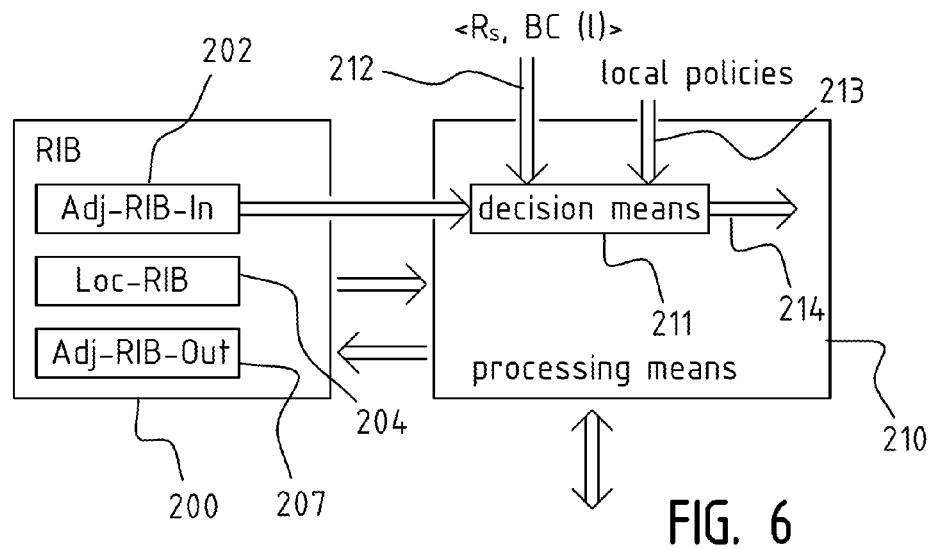
FIG. 6 is a schematic view of an embodiment of a router of the invention.

Finally, FIG. 6 illustrates an embodiment of a router system according to the invention, wherein only the parts relevant for the present invention have been shown. The router system uses a RIB 200 which is updated by a processing means 210. The RIB 200 comprises an Adj-RIB-In 202, a Loc-RIB 204 and an Adj-RIB-Out 207. The processing means 210 comprise a decision means 211 and typically also import and export policy applications means (not shown in FIG. 6, but illustrated in FIG. 1). The decision means 211 are adapted to select, for each destination, a path from the number of paths for that destination in the Adj-RIB-In 202. To make this decision the decision means use amongst others information 212 derived from incoming update messages, e.g. the <Rs, BC(l)> tuples as defined above, and local policy information 213, typically stored in a policy information base (not shown). As explained above with reference to FIG. 1, the selected path 214 will then be used by the processing means 210 to update the Loc-RIB 204, the Adj-RIB-Out 207 and typically also other entities such as the forwarding table of the forwarding part of the router.

While the principles of the invention have been set out above in connection with specific embodiments, it is to be clearly understood that this description is merely made by way of example and not as limitation of the scope of protection which is determined by the appended claims.

The invention claimed is:
1. A method comprising:
  creating an update message at a first node of a network, the update message including first routing information for updating a routing information base of a peer of the first node, said first routing information including, at least one path to a first destination node of a number of destination nodes, said at least one path including a next hop node that is adjacent to the first node, and at least one routing topology variable derived from the at least one path to said first destination node, said at least one routing topology variable indicating a risk of bottlenecks in the at least one path, the risk of bottleneck being based on a failure of transmission by one or more nodes on the at least one path; and sending the update message to the peer of the first node, the peer of the first node determining a path for communication with another node based on at least the update message received from the first node.

2. The method of claim 1, wherein the at least one routing topology variable is derived from the at least one path to said first destination.

3. The method of claim 1, wherein said at least one routing topology variable comprises at least one of, a diversity variable related to the at least one path in the first routing information base for said first destination node; and a concentration variable related to the at least one path in the first routing information base having the same next-hop node as the selected path for the first destination node.

4. The method of claim 3, wherein said peer of the first node has a routing information base, and said peer of the first node updates the routing information base of said peer based on the at least one topology variable received from the first node.

5. The method of claim 1, wherein, the first node and the peer are Border Gateway Protocol (BGP) routers, the routing information base of the first node and it's the peer each includes, a first part (Adj-RIBS-In) configured to store routing information from inbound update messages;

a second part (Loc-RIB) configured to store selected local routing information, and a third part (Adj-RIBs-Out) configured to store the routing information to be included in outbound update message, the selected path contained in the update message sent by the first node is stored in the first part, and the second part and the third part are updated based on the at least one topology variable contained in the update message.

6. The method of claim 3, wherein the diversity variable is related to the at least one path in a first part of the first routing information base for said first destination node, the first part (Adj-RIBs-In) configured to store routing information from inbound update messages.

7. The method of claim 6, wherein a concentration variable is related to the number of paths stored in the second part of the first routing information base having the same next-hop node as the selected path for the destination node.

8. The method of claim 3, wherein, the update message is a Border Gateway Protocol (BGP) update message comprising an AS_Path attribute with the selected path, and the diversity and concentration variable are encoded as a vector matching the AS_Path attribute.

9. The method of claim 1, wherein, each node of the network sends update messages as defined in claim 1, and the update message sent by each node also includes the at least one topology variable received from a corresponding peer if said peer is present in the selected path for said first destination.

10. The method of claim 9, wherein the update message sent by each node also includes the at least one topology variable from each node present in the selected path as received through a corresponding peer present in the selected path.

11. A router comprising:

a routing information base including, for each destination node of a number of destination nodes of a network, at least one path, the router being configured to, create an update message, the update message including first routing information for updating a routing information base of a peer of the router, the first routing information including, at least one path to a first destination node of a number of destination nodes, said at least one path including a next hop node that is adjacent to the router, and at least one routing topology variable derived from the at least one path to said first destination node, said at least one routing topology variable indicating a risk of bottlenecks in the at least one path, the risk of bottleneck being based on a failure of transmission by one or more nodes on the at least one path, and send the update message to the peer of the router, the peer of the router determining a path for communication with another node based on at least the update message received from the router.

12. The router of claim 11, wherein the at least one routing topology variable comprises at least one of, a diversity variable related to the at least one path in the first routing information base for the first destination node; and a concentration variable related to the at least one path in the first routing information base having the same next hop as the selected path for the first destination node.

13. The router of claim 11, wherein the router further comprises:

a processor configured to process information in the router information base, and update the routing information base based on the at least routing topology variable.

14. The router of claim 11, wherein, the router is a Border Gateway Protocol (BGP) router; and the routing information base comprises a Loc-RIB part, an Adj-RIB-In part and an Adj-RIB-Out part.

* * * * *